United States Patent
Keener et al.

(10) Patent No.: US 6,214,308 B1
(45) Date of Patent: Apr. 10, 2001

(54) PROCESS FOR REMOVAL OF NITRIC OXIDES AND SULFUR OXIDES FROM FLUE GASES

(75) Inventors: Timothy C. Keener; Soon-Jai Khang, both of Cincinnati, OH (US); Antoinette Weil Stein, Menlo Park, CA (US)

(73) Assignee: The University of Cincinnati, Cincinnati, OH (US)

( * ) Notice: Subject to any disclaimer, the term of this patent is extended or adjusted under 35 U.S.C. 154(b) by 0 days.

(21) Appl. No.: 09/208,353

(22) Filed: Dec. 9, 1998

(51) Int. Cl.$^7$ ............................. B01D 53/50; B01D 53/56
(52) U.S. Cl. .................. 423/239.1; 423/244.07; 423/244.08
(58) Field of Search .................. 423/235, 239.1, 423/243.08, 244.07, 244.08

(56) References Cited

U.S. PATENT DOCUMENTS

| | | | |
|---|---|---|---|
| 3,305,307 | * 2/1967 | Spormann et al. | 423/243.08 |
| 3,977,844 | 8/1976 | Van Slyke | 48/202 |
| 4,140,651 | * 2/1979 | Burnell et al. | 252/188 |
| 4,197,278 | 4/1980 | Gehri et al. | 423/242 |
| 4,425,313 | 1/1984 | Cooper | 423/235 |
| 4,645,652 | * 2/1987 | Kimura | 423/235 |
| 4,681,045 | 7/1987 | Dvirka et al. | 110/345 |
| 4,839,147 | 6/1989 | Lindbauer et al. | 423/235 |
| 5,059,406 | 10/1991 | Sheth et al. | 423/244 |
| 5,165,902 | 11/1992 | Bortz et al. | 423/235 |

OTHER PUBLICATIONS

Chu et al. "Removal of $SO_2$ and $NO_x$ from Stack Gas . . ." JAPCA vol. 39 No. 2 pp. 175–179, Feb. 1989.*

* cited by examiner

Primary Examiner—Steven P. Griffin
Assistant Examiner—Timothy C Vandy
(74) Attorney, Agent, or Firm—Flehr Hohbach Test Albrittion & Herbert LLP

(57) ABSTRACT

A two stage method is described for the removal of $NO_x$ and $SO_x$ from flue gas. The first stage removes all $NO_x$ by sodium sulfite sorbent injection. The second stage removes $SO_x$ by sodium bicarbonate injection. The sodium sulfite product formed in the second stage is transferred to the first stage for injection.

8 Claims, 1 Drawing Sheet

PROCESS FOR REMOVAL OF NITRIC OXIDES AND SULFUR OXIDES FROM FLUE GASES

BRIEF DESCRIPTION OF THE INVENTION

A process is described for the removal of nitric oxides and sulfur oxides from flue gases. More particularly, a two-stage process is described for the removal of nitric oxides and sulfur oxides from flue gases.

BACKGROUND OF THE INVENTION

To conform with government regulations, primarily in the Acid Rain section, Title IV, of the Clean Air Act, energy providers that burn sulfur containing fuels are increasingly responsible for assuring that exit flue gas emissions meet low levels of $SO_x$ and $NO_x$. With these stipulated regulations, new methods of flue gas scrubbing for $SO_x$ and $NO_x$ are increasingly important for energy providers.

$SO_x$ in combustion flue gases are created due to sulfur oxidation by the combustion processes where the sulfur originates in the coal or oil fossil fuel. Likewise $NO_x$ is formed partially by the oxidation of nitrogen in the fuel during combustion but also by the oxidation of nitrogen in the air mixture at high temperature and dwell time during combustion.

Many processes have been proposed and used for the removal of $SO_x$ from the flue gases including dry injection, slurry injection (spray dryer), and wet scrubbing. The injection of dry alkaline sorbents such as lime and sodium based salts has been recognized as an available technology for control of $SO_2$. Flue gas desulfurization by the injection of dry sodium-based reagents has been investigated in the laboratory since the 1960s. Pilot plant and full scale testing has successfully been demonstrated. These processes are of interest because they require low capital investment. The use of these materials has gained popularity in regions such as the western United States where the materials are geologically available relative to other desulfurization reagents.

In the early 1990s it was discovered that sodium sorbents used for desulfurization in $SO_2$ flue gas which contained NO resulted in an unwanted brown discoloration of the exit plume. This unwanted side effect jeopardized the feasibility of the process. A number of processes have been proposed to eliminate the formation of the brown plume including the use of ammonia and urea injection. These processes produce undesirable side effects of their own, namely ammonia, urea and greenhouse gases.

Many processes have been proposed to reduce $NO_x$ emissions from flue gas, namely low $NO_x$ burners, combustion flame temperature reduction, flue gas recirculation, selective catalytic reduction, selective non-catalytic reduction with and without ammonia injection. These processes, however, require intensive capital investment.

A handful of processes have also been proposed to remove the combination of both $SO_x$ and $NO_x$. Sodium based sorbents have been suggested for $NO_x$ mitigation as additives with calcium based reagents, such as in the Niro process where sodium hydroxide or sodium sulfite solutions are used as additives in a wet slurry process. It has been reported that $NO_2$ and NO decomposed to $N_2$ by a wet sulfite solution. In a gas liquid system, absorption of $SO_2$ to form sulfites or bisulfites participate in reactions with $NO_x$.

Prior art processes using sodium bicarbonate sorbent for combined $SO_x$ and $NO_x$ removal provide relatively low removal rates of both $SO_x$ and $NO_x$, and low sorbent utilization.

OBJECTS AND SUMMARY OF THE INVENTION

It is a general object of the present invention to provide a method and apparatus for removal of nitric oxides and sulfur oxides from flue gases which avoids the shortcomings of the prior art.

It is a further object of the present invention to provide a simple, efficient and economical process for the removal of nitric oxides and sulfur oxides from flue gases.

It is a further object of the present invention to provide a process which removes nitric oxides from flue cases followed by the removal of sulfur oxides.

There is provided a process in which nitric oxides are removed from flue gases in a first stage by treating the flue gases with unoxidized sodium sulfite under conditions which minimize the reaction of sodium nitrite or nitrate with the sulfur oxides in the flue gases to minimize the formation of sodium sulfate and then removing sulfur oxide in a second stage by reacting the sulfur oxides with sodium bicarbonate.

BRIEF DESCRIPTION OF THE DRAWINGS

Additional objects and advantages of the present invention will become apparent to those skilled in the art by reference to the following detailed description thereof and the drawing which schematically shows the steps of the process.

DETAILED DESCRIPTION OF THE INVENTION

Figure 1:
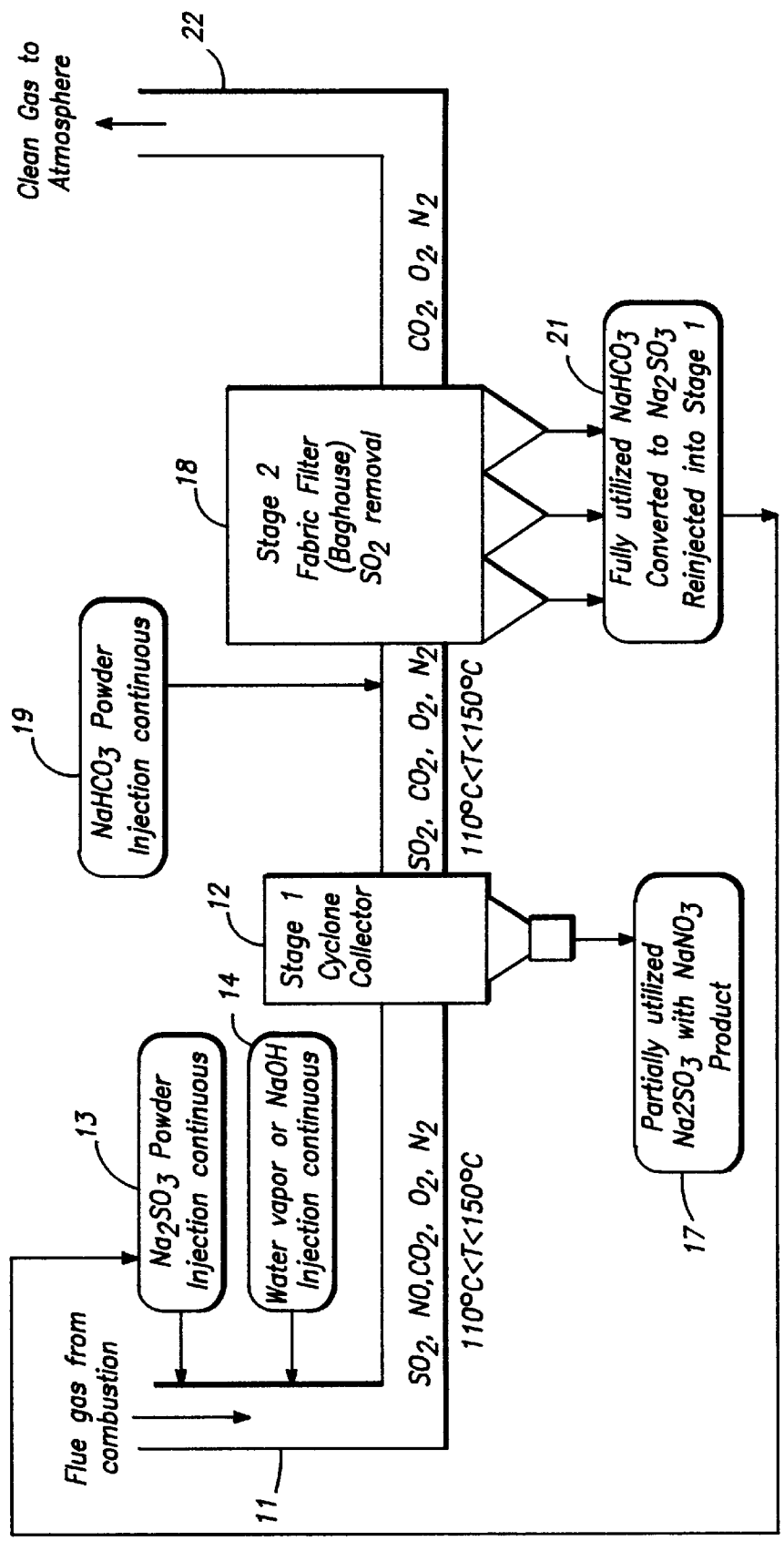

In our effort to provide a simple process for the efficient and economical removal of nitric oxides and sulfur oxides from flue gases, we considered the reaction of nitric oxide with sodium sulfite and sodium sulfate, and the reaction of sulfur oxide with sodium bicarbonate in the presence of nitric oxides.

First we considered the reaction path for the formation of $NO_2$ during desulfurization of flue gas containing $SO_2$ and NO. Prior to this invention the pathway for $NO_2$ formation was not well understood.

1) We found that sodium bicarbonate first reacted with $SO_2$ in the $SO_2$ flue gases containing NO to initially form a temperature dependent mixture of sodium sulfite and sodium sulfate.

2) For temperatures where sodium sulfite was formed (below 250° C.) we found a second reaction step. The sodium sulfite proceeded to react with NO and $O_2$ or $NO_2$ to form a temperature dependent mixture of sodium nitrite and sodium nitrate.

3) The third reaction step we found was that sodium nitrite and sodium nitrate reacted with $SO_2$ and $O_2$ to form sodium sulfate and a temperature dependent mixture of NO and $NO_2$.

4) The accumulation of sodium nitrite or nitrate was found to occur only when water vapor was available to react with sodium nitrite and fix itself on the surface of sodium nitrate. The removal of $SO_2$ and $NO_x$ was limited by the formation of a sodium sulfate ash layer in the final step in $NO_2$ formation. From this we realized that since $SO_2$ and $NO_x$ removal is significantly limited by the formation of sodium sulfate, and that the formation of sodium sulfate should be avoided. In particular, our novel process avoids sodium sulfate formation during $SO_2$ removal. This is achieved in two ways: first, sodium sulfate formation is avoided by taking out all $NO_x$ from the gas stream prior to the reaction of $SO_2$ with sodium bicarbonate. Without $NO_x$ in the gas stream, sodium sulfite is formed by the reaction of sodium bicarbonate with $SO_2$. Since there is no $NO_x$ present, the formation of sodium nitrite and nitrate are prevented, which prevents the further reaction of the sodium nitrite and nitrate with $SO_2$ which would form sodium sulfate and NO or $NO_2$. Secondly, sodium sulfate formation is avoided by maintaining the temperature of the reaction of sodium bicarbonate with $SO_2$ flue gas below 150° C. to assure no oxidation of sodium sulfite by $O_2$.

From the above observations we arrived at the two stage process of the present invention. The first stage is used to remove all $NO_x$ from the gas stream and the second stage is used for $SO_2$ removal. The reactions and the reaction temperatures described and defined for the removal of $SO_2$ by sodium bicarbonate have been well established. What makes our process unique is the staging technique which removes $NO_x$ from the flue gas prior to its contact and reaction with sodium bicarbonate during the $SO_2$ removal.

$NO_x$ removal in the first stage is achieved by reacting fresh unoxidized sodium sulfite powder with $NO_x$ in the flue gas. Sodium sulfate formation is avoided in the first stage to provide high $NO_x$ removal and high sorbent utilization. Two conditions are applied to the first stage to avoid sodium sulfate formation. First the temperature in the first stage is maintained below 150° C., preferably around 110° C., to minimize the reaction of sodium nitrite or nitrate with the $SO_2$ in the flue gas. Based on reaction tests of sodium nitrate with $SO_2$ it was found that lower temperatures result in less sodium sulfate formation. Secondly, water vapor or an additive such as sodium hydroxide, which provides water vapor, may be added to promote oxidation of sodium nitrite to sodium nitrate and to prevent the sodium nitrate from reacting with the $SO_2$.

FIG. 1 is a schematic diagram of apparatus suitable for carrying out the process of the present invention. The flue gas from combustion is shown applied to the conduit 11 which directs the flue gas into the first stage apparatus. In the present example, a cyclone collector 12, although other particulate control devices would be acceptable. The flue gas contains $SO_2$, $NO_x$, $CO_2$, $O_2$ and $N_2$. Sodium sulfite, $NO_2SO_3$ is also continuously injected into the flue gas stream by a suitable injector 13. In the preferred embodiment, water vapor or sodium hydroxide, NaOH, is continuously injected into the flue gas stream by a suitable injector 14. For existing systems with fabric filters the first stage collector 12 is placed before the fabric filter. The flue gas temperature at the first stage 12 should be less than 150° C., preferably about 110° C. This may require the addition of a heat extractor (not shown) prior to this first stage 12. The temperature is adjusted below 150° C. to obtain more $NO_x$ removal per unit of sorbent injection. Depending upon the flue gas volumetric flow rate a stoichiometric ratio greater than one is needed for sodium sulfite sorbent injection into the first stage. The sorbent preferably has a particle size less than 120 micrometers in diameter; the particle size for best $NO_x$ removal. The sodium sulfite sorbent must be of a fresh grade and must not have any surface oxidation of sodium sulfate from storage life or moist air exposure. The sodium sulfite sorbent injected into stage one may be recycled through stage one as long as it does not have any surface oxidation, sodium sulfate, formed from storage or any other conditions. The sodium sulfite sorbent injected into stage one may be the product formed at stage two, as will be presently described, as long as no sodium sulfate has formed in the stage two reaction or from storage or handling during transfer from stage two to stage one. The cyclone collector 12, which collects the stage one particulates, could be replaced by a fabric filter baghouse, an ESP, or any other collector. The collector choice is based on the gas solid contact needed to provide adequate $NO_x$, removal and to avoid $NO_x$ flow to the second stage. The unreacted sodium sulfite, $Na_2SO_3$ and the sodium nitrite, $NaNO_3$ formed in the reaction of the nitric oxides with the sodium sulfite, are collected as illustrated at 17.

In the process it is essential that substantially all flue gas $NO_x$ is removed in the first stage such that the second stage can remove high amounts of $SO_2$. If all of the $NO_x$ is not removed in the first stage the second stage will not obtain high $SO_2$ removals since sodium sulfate product will form in the second stage and cause significant ash layer resistance and inhibit high rates of $SO_2$ removal. Also, if substantially all of the $NO_x$ is not removed in the first stage it is likely that $NO_2$ will form at the exit of the second stage. To obtain full removal of flue gas $NO_x$ by the first stage, plenty of sodium sulfite must be injected into the first stage. The sodium sulfite should be of a fresh nature, whereby there is no oxide, sodium sulfate, scale formed on its outer surface prohibiting it from reacting with flue gas $NO_x$. To assure that the sodium sulfite is free of the inhibiting sodium sulfate scale, the sodium sulfite should be processed fresh without shelf life or exposure to moist air. Sodium sulfite must be stored in sealed dry air free containers.

The remaining flue gases, $SO_2$, $CO_2$, $O_2$, and $N_2$, from stage one flow into the baghouse 18. Sodium bicarbonate, $NaHCO_3$ powder is continuously injected into the remaining fuel gas stream by a suitable injector 19.

Alternate sorbent injection may be used to remove $NO_x$ in the first stage such as sodium bisulfite, sodium pyrosulfite, sodium sulfite heptahydrate or sodium bicarbonate or nahcolite ($NaHCO_3$), or sodium sesquicarbonate or trona ($Na_2CO_3 \cdot NaHCO_3 \cdot 2H_2O$). For these alternate sorbents their time of flight and total dwell time allowed in the flue gas duct must be limited to their respective dehydration or water loss periods to assure that $NO_x$ is being removed by these materials and that $NO_2$ is not being formed. Additionally, water vapor or other water containing materials may be injected with the sorbent to enhance $NO_x$ removal and assure no $NO_2$ formation. The second stage temperature is between 100° C. and 150° C. so that the injected sodium bicarbonate sorbent dehydrates simultaneously with desulfurization and such that maximum $SO_2$ removal is obtained. The sodium bicarbonate sorbent is preferably less than 120 micrometer in diameter for superior $SO_2$ removal. A stoichiometric ratio greater than one is used for this sorbent in the $SO_2$ flue gas. The sorbent is injected at a distance from the particulate collection device 18 to increase the reaction time and maximize $SO_2$ removal. The sodium bicarbonate reacts with the $SO_2$ to form sodium sulfite, as shown at 21, which can be reinjected into the first stage as described above. The clean gases $CO_2$, $O_2$ and $N_2$ flow through conduit 22 into the atmosphere.

There has been provided a simple, efficient and economical process which removes nitric oxides from flue gases followed by removal of sulfur oxides to exhaust clean gases into the atmosphere from the combustion of sulfur containing fuels.

What is claimed is:

1. The process for removing nitric oxides and sulfur oxides from flue gases comprising the steps of injecting sodium sulfite particles and water vapor into the flue gas stream which reacts with the nitric oxides in the flue gases to form sodium nitrate, removing the sodium nitrate and unreacted sodium sulfite from the flue gases, and thereafter injecting sodium bicarbonate particles into the flue gas stream to react with the sulfur dioxide in the gas stream and form sodium sulfite particles collecting the sodium sulfite particles and injecting the collected sodium sulfite particles into the flue gas stream to react with said nitric oxides.

2. The process of claim 1 in which the temperature of the flue gases which react with the sodium sulfite particles and water vapor is maintained between 100° C. and 150° C.

3. The process of claim 2 in which the temperature is about 110° C.

4. The process of claim 1, 2 or 3 in which the temperature of the flue gases which react with the sodium bicarbonate particles is between 100° C. and 150° C.

5. The process of claim 1, 2 or 3 in which the particle size of the sodium sulfite particles is less than 120 micrometers in diameter.

6. The process of claim 5 in which the particle size of the sodium bicarbonate particles is less than 120 micrometers in diameter.

7. The process of claim 1, 2 or 3 in which the stoichiometric ratio of sodium sulfite with respect to nitric oxide is greater than one.

8. The process of claim 1, 2 or 3 in which the stoichiometric ratio of sodium bicarbonate with respect to sulfur oxide is greater than one.

* * * * *